US007814883B2

(12) United States Patent
Hotta et al.

(10) Patent No.: US 7,814,883 B2
(45) Date of Patent: Oct. 19, 2010

(54) INTERNAL COMBUSTION ENGINE WITH AUXILIARY COMBUSTION CHAMBER

(75) Inventors: Isamu Hotta, Yokohama (JP); Eiji Takahashi, Yokosuka (JP); Toru Noda, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 311 days.

(21) Appl. No.: 11/987,130

(22) Filed: Nov. 27, 2007

(65) Prior Publication Data
US 2008/0196690 A1  Aug. 21, 2008

(30) Foreign Application Priority Data
Nov. 28, 2006  (JP) .............................. 2006-319625

(51) Int. Cl.
F02B 19/00 (2006.01)
F02F 3/26 (2006.01)

(52) U.S. Cl. ..................................... 123/267; 123/280

(58) Field of Classification Search ................. 123/274, 123/253, 260, 261, 262, 267, 279, 280, 291, 123/293, 275–278
See application file for complete search history.

(56) References Cited

U.S. PATENT DOCUMENTS

| 2,231,173 A * | 2/1941 | Starr ............................ 123/261 |
| 2,914,043 A * | 11/1959 | Nallinger ...................... 123/275 |
| 3,295,506 A * | 1/1967 | Wisniowski ................. 123/276 |
| 3,924,598 A * | 12/1975 | Davis .......................... 123/306 |
| 4,034,733 A * | 7/1977 | Noguchi et al. .............. 123/268 |
| 4,091,772 A * | 5/1978 | Heater et al. ................. 123/575 |
| 4,140,090 A * | 2/1979 | Lindberg ..................... 123/265 |
| 4,239,023 A * | 12/1980 | Simko ......................... 123/275 |
| 4,401,072 A * | 8/1983 | Ito et al. ...................... 123/292 |
| 4,414,940 A * | 11/1983 | Loyd ........................... 123/299 |
| 4,831,982 A * | 5/1989 | Baranescu ................... 123/275 |
| 5,291,865 A * | 3/1994 | Sasaki ......................... 123/298 |
| 6,092,501 A * | 7/2000 | Matayoshi et al. .......... 123/301 |
| 6,173,690 B1 * | 1/2001 | Iriya et al. ................... 123/295 |
| 6,257,197 B1 * | 7/2001 | Nishimura et al. .......... 123/295 |

FOREIGN PATENT DOCUMENTS

JP  2004-11517  1/2004

* cited by examiner

Primary Examiner—Mahmoud Gimie
(74) Attorney, Agent, or Firm—Drinker Biddle & Reath LLP

(57) ABSTRACT

An internal combustion engine, including a main combustion chamber serving as a main combustion chamber, an auxiliary combustion chamber adjacent to the main combustion chamber and smaller in capacity than the main combustion chamber, and a partition wall between the main combustion chamber and the auxiliary combustion chamber, the partition wall including an injection hole by which the main combustion chamber and the auxiliary combustion chamber communicate. A fuel supply device supplies fuel to the main combustion chamber and the auxiliary combustion chamber. A mixture forming device forms a mixture of air and the supplied fuel in the main combustion chamber, away from the partition wall before ignition. An ignition device ignites the fuel in the auxiliary combustion chamber, propelling an ejecting torch flame into the mixture of air and fuel in the main combustion chamber through the injection hole, thereby burning the mixture of air and fuel in the main combustion chamber.

25 Claims, 13 Drawing Sheets

STRATIFIED AIR-FUEL MIXTURE
VIEWED FROM ABOVE

RICH BURN — EMISSION OF UNBURNED FUEL — LEAN BURN

STRATIFIED AIR-FUEL MIXTURE VIEWED FROM ABOVE

STRATIFIED AIR-FUEL MIXTURE
VIEWED FROM ABOVE

INTERNAL COMBUSTION ENGINE WITH AUXILIARY COMBUSTION CHAMBER

CROSS-REFERENCE TO RELATED APPLICATIONS

This application claims priority under 35 U.S.C. §119 to Japanese Patent Application No. 2006-319625, filed on Nov. 28, 2006, the disclosure of which is incorporated by reference herein in its entirety.

BACKGROUND OF THE INVENTION

1. Field of the Invention

The present invention relates to an internal combustion engine with auxiliary combustion chamber that has a main combustion chamber and an auxiliary combustion chamber smaller than the main combustion chamber.

2. Description of Related Art

Spark-ignition internal combustion engines that improve heat efficiency by lean burn are known. However, lean burn degrades the stability of combustion. In view of this problem, a related art internal combustion engine includes a main combustion chamber serving as a main combustion chamber, an auxiliary combustion chamber smaller in capacity than the main combustion chamber, an injection hole by which the main and auxiliary combustion chambers communicate, fuel supply devices that supply fuel to the main and auxiliary combustion chambers, and an ignition plug capable of igniting the fuel in the auxiliary combustion chamber. The internal combustion engine ignites the fuel in the auxiliary combustion chamber by the ignition plug, and propels a ejecting torch flame into the main combustion chamber through the injection hole, thereby burning an air-fuel mixture.

The related art internal combustion engine can expand a lean limit but cannot improve heat efficiency sufficiently due to an increase in unburned fuel. This is because under lean burn conditions, torch speed is so high in the vicinity of the injection hole that an air-fuel mixture in the vicinity of the injection hole cannot be burned and consequently unburned fuel is emitted from the vicinity of the injection hole.

BRIEF SUMMARY OF THE INVENTION

The present invention has been made in view of the drawbacks of the related art. It is therefore an object of the invention to improve heat efficiency by reducing unburned fuel emitted from the vicinity of the injection hole.

In an embodiment, the invention provides an internal combustion engine, including a main combustion chamber, an auxiliary combustion chamber adjacent to the main combustion chamber and smaller in capacity than the main combustion chamber, and a partition wall between the main combustion chamber and the auxiliary combustion chamber, the partition wall including an injection hole by which the main combustion chamber and the auxiliary combustion chamber communicate. A fuel supply device supplies fuel to the main combustion chamber and the auxiliary combustion chamber. A mixture forming device forms a mixture of air and the supplied fuel in the main combustion chamber, away from the partition wall before ignition. An ignition device ignites the fuel in the auxiliary combustion chamber, propelling a torch flame into the mixture of air and fuel in the main combustion chamber through the injection hole, thereby burning the mixture of air and fuel in the main combustion chamber.

In another embodiment, the invention provides a combustion method for an internal combustion engine. The engine includes a main combustion chamber serving as a main combustion chamber, an auxiliary combustion chamber adjacent to the main combustion chamber and smaller in capacity than the main combustion chamber, a partition wall between the main combustion chamber and the auxiliary combustion chamber, the partition wall including an injection hole by which the main combustion chamber and the auxiliary combustion chamber communicate, a fuel supply device for supplying fuel to the main combustion chamber and the auxiliary combustion chamber, and an ignition device. The method includes forming a mixture of air and the supplied fuel in the main combustion chamber, away from the partition wall, before ignition, igniting the fuel in the auxiliary combustion chamber by the ignition device, and propelling an ejecting torch flame in the auxiliary combustion chamber into the mixture of air and fuel in the main combustion chamber through the injection hole, thereby burning the mixture of air and fuel in the main combustion chamber.

According to the present invention, an air-fuel mixture is formed nearly at the moment of ignition in a main combustion chamber and away from a partition wall defining an auxiliary combustion chamber, and an ejecting torch flame is propelled into the air-fuel mixture in the main combustion chamber through an injection hole, thereby burning the air-fuel mixture in the main combustion chamber.

According to the present invention, an air-fuel mixture is formed in the main combustion chamber and away from the auxiliary combustion chamber such that the air-fuel mixture is not disposed near the injection hole where it is difficult to cause combustion by an ejecting torch flame. This reduces emission of unburned fuel from the vicinity of the injection hole and improves heat efficiency.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Embodiments of the invention will be described hereinbelow with reference to the accompanying drawings.

Figure 1:
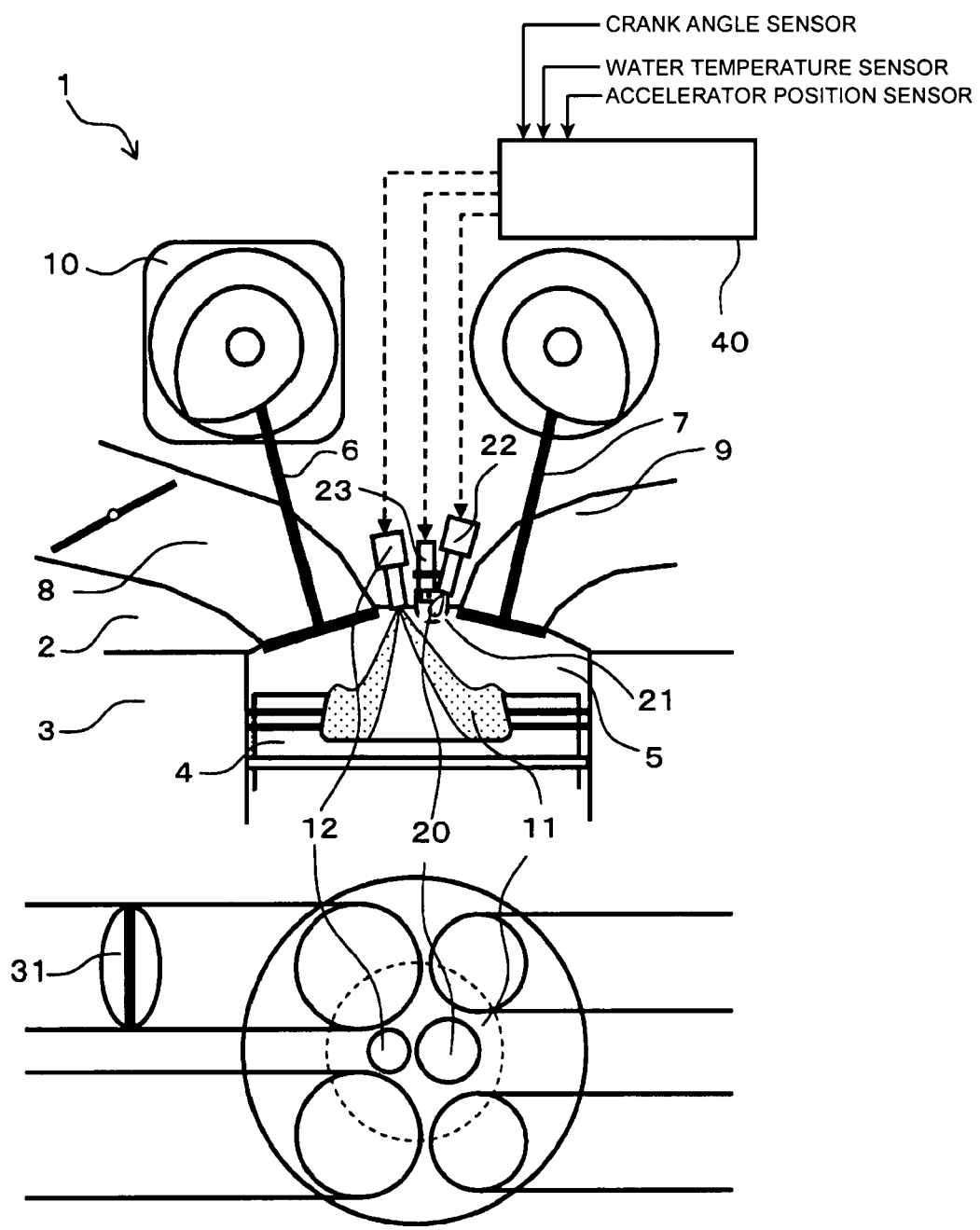
FIG. 1 is a diagram showing the configuration of an internal combustion engine according to a first embodiment of the invention.

FIG. 1 is a diagram showing the configuration of an internal combustion engine (hereinafter referred to as "engine") according to a first embodiment of the present invention.

The engine 1 has a main combustion chamber (hereinafter referred to as "main combustion chamber") 5 defined by a cylinder head 2, a cylinder block 3, and a piston 4.

The main combustion chamber 5 can be supplied with intake air from an intake passage, namely an intake port 8, via an intake valve 6 and can eject exhaust into an exhaust passage, namely an exhaust port 9, via an exhaust valve 7.

A fuel pump 10 is mounted at the end of a cam shaft that drives the intake valve 6. The fuel pump 10 is not limited to a mechanical type, but may be of any type, such as an electronic feed pump, as long as fuel can be pressurized. Fuel pressurized by the fuel pump 10 is supplied to a fuel injection valve 12 to inject fuel directly into a cylinder (hereinafter referred to as "cylinder fuel injection valve 12"). The fuel injection valve 12 is a first fuel-injecting valve that supplies the fuel to the main combustion chamber. The fuel injection valve 12 is located approximately in the middle of the top face of the main combustion chamber 5 so as to be oriented toward the piston crown 4, and injects fuel during a compression stroke.

Arranged above the main combustion chamber 5 is an auxiliary combustion chamber 20 smaller in capacity than the main combustion chamber 5. A partition wall separating the main combustion chamber 5 and the auxiliary combustion chamber 20 has an injection hole 21, by which the main and auxiliary combustion chambers 5 and 20 communicate. An auxiliary combustion chamber fuel injection valve 22 and an ignition plug 23 face the auxiliary combustion chamber 20. The auxiliary combustion chamber fuel injection valve 22 is a second fuel-injecting valve that supplies fuel to the auxiliary combustion chamber 20; and the ignition plug 23 is an igniting device capable of igniting the fuel in the auxiliary combustion chamber 20. It is also possible to use, instead of the ignition plug 23, other igniting devices, such as a glow plug or laser ignition device capable of igniting the fuel in the auxiliary combustion chamber 20.

The fuel supplied to the auxiliary combustion chamber 20 may be the same as that supplied to the main combustion chamber 5. However, a fuel that burns faster than that supplied to the main combustion chamber 5 is preferable. In particular, high-octane liquid fuel rich in aromatic compounds or gas fuel rich in hydrogen is preferable. In the case where the fuel supplied to the auxiliary combustion chamber is different from that supplied to the main combustion chamber, the fuel for the main combustion chamber 5 and that for the auxiliary combustion chamber 20 may be separately stored in respective fuel tanks. However, in terms of layout, it is preferable to incorporate a modifying device in order that fuel conveyed along a branch line from a fuel tank is modified by, for example, a dehydrogenation reductive reaction and this modified fuel is supplied to the auxiliary combustion chamber 20 as a fuel that has a faster burning speed.

In order to create a swirling flow within the main combustion chamber 5 during the intake stroke, either of the two intake ports 8 in each cylinder is provided with a swirl control valve 31 capable of opening or closing the cross-section of the port.

The piston crown 4 has a concave cavity 11 at its center. In FIG. 1, the upper part of a peripheral wall defining the cavity 11 tapers towards the center of the cylinder.

An engine control unit (hereinafter referred to as "ECU") 40 receives signals from a crank angle sensor, a cooling water temperature sensor, an accelerator position sensor, etc. Based on the input signals, the ECU controls the cylinder fuel injection valve 12, the auxiliary combustion chamber fuel injection valve 22, the ignition plug 23, etc.

Referring to FIGS. 2A to 2E, operation according to the first embodiment will now be described.

Figure 2:
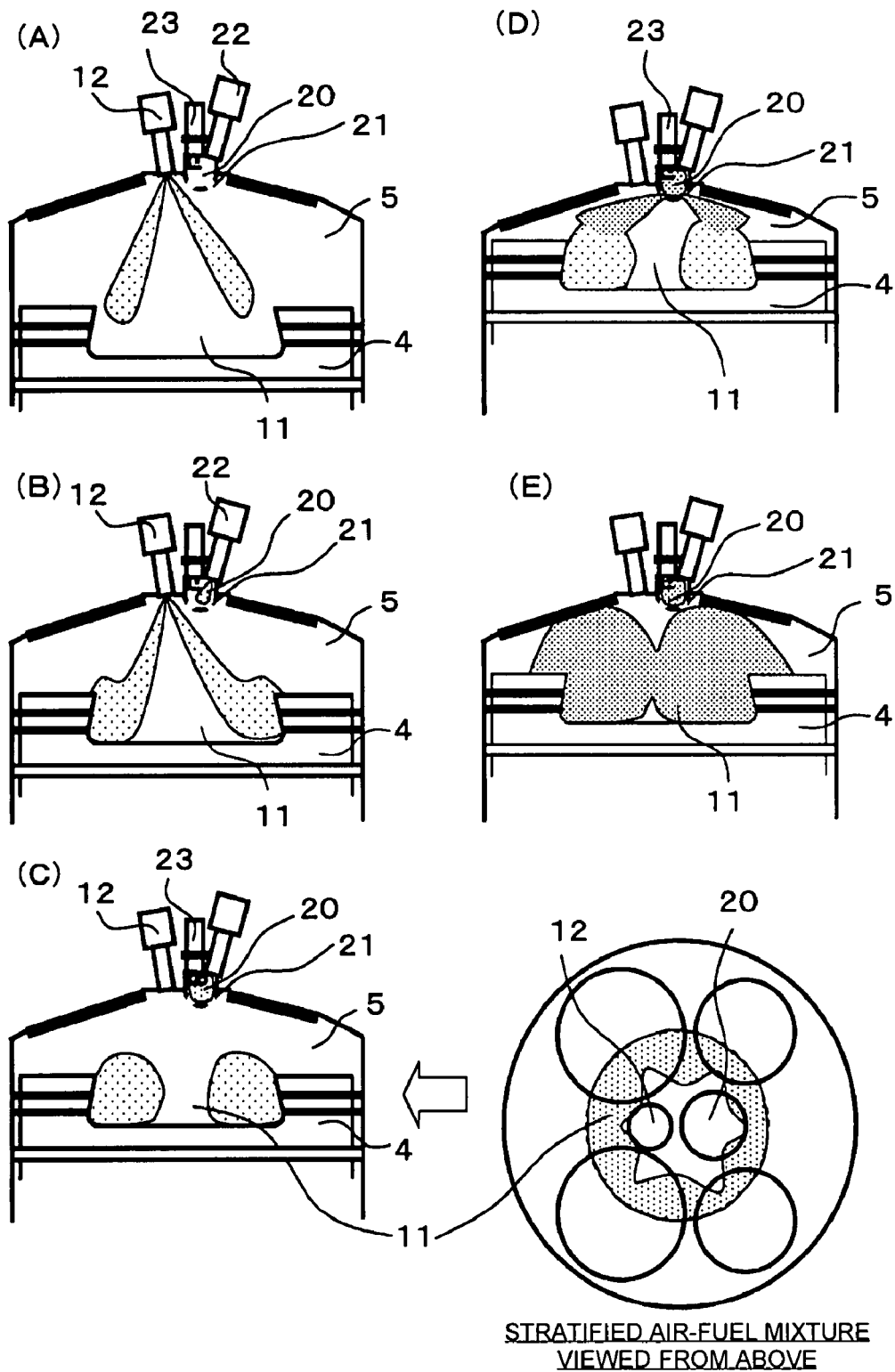
FIGS. 2A to 2E illustrate the formation of an air-fuel mixture and combustion by a torch according to the first embodiment.

During the compression stroke, fuel is injected toward the cavity 11 of the piston crown 4 by the cylinder injection valve 12, and consequently an air-fuel mixture stratifies in a doughnut form within the cavity 11, as shown in FIGS. 2A to 2C. Accordingly, an air-fuel mixture is formed in the main combustion chamber 5, separate from the auxiliary combustion chamber 20. Shortly after the injection of the fuel by the cylinder fuel injection valve 12, another fuel is injected into the auxiliary combustion chamber 20 by the auxiliary combustion chamber fuel injection valve 22, as shown in FIG. 2B, and the fuel in the auxiliary combustion chamber 20 is ignited by the ignition plug 23, as shown in FIG. 2C. Then, an ejecting torch flame resulting from the ignition of the fuel in the auxiliary combustion chamber 20 is propelled into the main combustion chamber 5 from the auxiliary combustion chamber 20 so that the ejecting torch flame reaches the air-fuel mixture stratified in the cavity 11 of the main combustion chamber 5, thereby burning the air-fuel mixture, as shown in FIGS. 2D and 2E. At this time, the air-fuel mixture is not present in the vicinity of the injection hole 21 where it is difficult to cause combustion by the ejecting torch flame. Therefore, even under lean burn conditions where the torch speed becomes higher in the vicinity of the injection hole 21 as shown in FIG. 3, emission of unburned fuel from the vicinity of the injection hole can be reduced and hence heat efficiency is improved.

Figure 3:
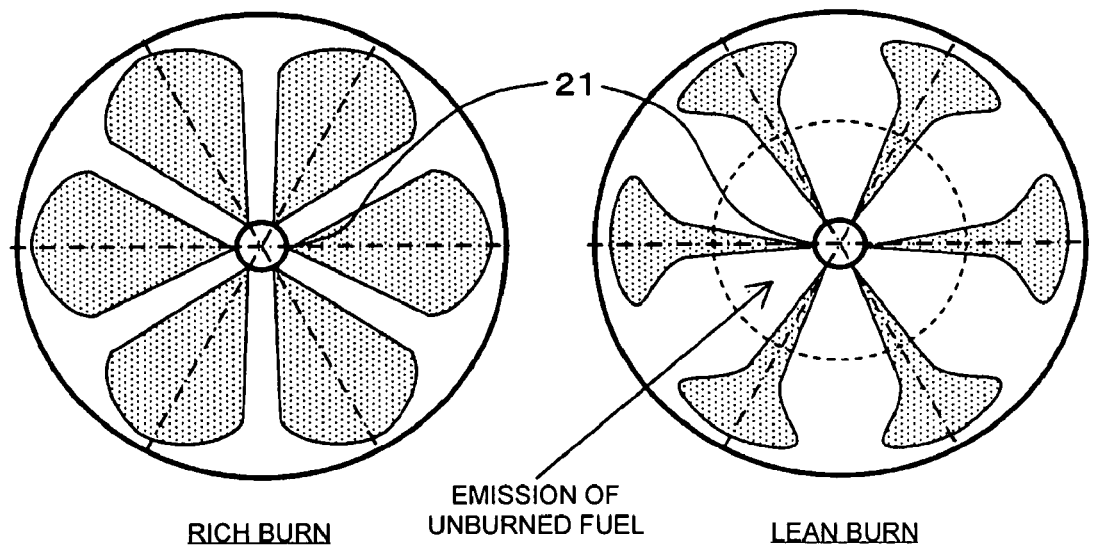
FIG. 3 is a view showing a comparison between rich burn and lean burn by a torch.

FIG. 3 is a view showing a comparison between rich burn conditions and lean burn conditions for burning an air-fuel mixture with an ejecting torch flame within the main combustion chamber 5. In the rich burn conditions, the torch speed in the vicinity of the injection hole 21 is suitable to burn the air-fuel mixture. In the lean burn conditions, however, the torch speed in the vicinity of the injection hole 21 is so high that it is difficult to burn the air-fuel mixture. This results in emission of unburned fuel from the vicinity of the injection hole 21.

According to the first embodiment, the fuel supply apparatus for supplying fuel to the main combustion chamber 5 and auxiliary combustion chamber 20 includes the first fuel-injecting valve (i.e., cylinder fuel injection valve 12) that supplies fuel to the main combustion chamber 5, and the second fuel-injecting valve (i.e., the auxiliary combustion chamber fuel injection valve 22) that supplies fuel to the auxiliary combustion chamber 20, respectively. Accordingly, an air/fuel ratio in the auxiliary combustion chamber 20 can be controlled such that an ejecting torch flame of optimum intensity for operating conditions can be propelled through the injection hole 21. Further, since the first fuel-injecting valve (i.e. fuel injection valve 12) that supplies fuel to the main combustion chamber 5 is capable of directing and propelling the fuel, an air-fuel mixture can be more securely stratified in the main combustion chamber 5.

According to the first embodiment, the first fuel-injecting valve (i.e. cylinder fuel injection valve 12) is located approximately in the center of the top face of the main combustion chamber 5, and injects fuel during the compression stroke while being kept oriented toward the piston crown 4. Accordingly, the air-fuel mixture supplied to the main combustion chamber 5 is uniform around the axis of the cylinder.

According to the first embodiment, the second fuel-injecting valve (i.e. auxiliary combustion chamber fuel injection valve 22) is arranged directly opposite the auxiliary combustion chamber 20. This makes it possible to supply fuel to the auxiliary combustion chamber 20 more reliably than in the case where the second fuel-injecting valve (i.e. fuel injection valve 22) is not arranged.

Allowing the second fuel-injecting valve (i.e. fuel injection valve 22) to supply fuel that burns faster than the fuel supplied by the first fuel-injecting valve (i.e. fuel injection valve 12) makes the jet of torch flame from the injection hole 21 more powerful. Accordingly, an air-fuel mixture can be more securely burned in the main combustion chamber.

In the case where fuel supplied by the second fuel-injecting valve (i.e. fuel injection valve 22) is obtained by modifying fuel to be supplied by the first fuel-injecting valve (i.e. fuel injection valve 12), the need for fuel tanks for the corresponding fuels is obviated, which is advantageous to the layout of a vehicle.

According to the first embodiment, the piston crown 4 includes cavity 11, where an air-fuel mixture supplied by the main combustion chamber 5 can be stratified. Therefore, an air-fuel mixture can be more reliably formed in the main combustion chamber 5, separate from the auxiliary combustion chamber 20, in comparison with the case in which the piston crown 4 has no cavity 11.

According to the first embodiment, a swirling flow effected by swirl control valve 31 boosts the mixing of air and fuel within the main combustion chamber 5. Also, a swirling flow makes it possible to stratify an air-fuel mixture in the cavity 11 defined in the main combustion chamber 5. With this configuration, an air-fuel mixture can be securely formed away from the injection hole of the partition wall.

According to the first embodiment, the upper part of the peripheral wall defining the cavity 11 in the piston crown 4 tapers toward the cylinder center. This configuration prevents an air-fuel mixture from diffusing in the main combustion chamber 5, and makes it possible to pool the air-fuel mixture in the vicinity of the piston crown 4, so that an air-fuel mixture is reliably formed away from the injection hole in the partition wall.

According to the first embodiment, since the auxiliary combustion chamber 20 is located above the main combustion chamber 5, an ejecting torch flame can be propelled through the injection hole 21 evenly around the cylinder axis. Accordingly, the ejecting torch flame uniformly reaches the air-fuel mixture formed away from the injection hole and burns this air-fuel mixture.

Next, with reference to FIG. 4, a description will be given as to the relation between an engine load and a quantity of fuel injected by the second fuel-injecting valve that supplies fuel to the auxiliary combustion chamber 20.

Figure 4:
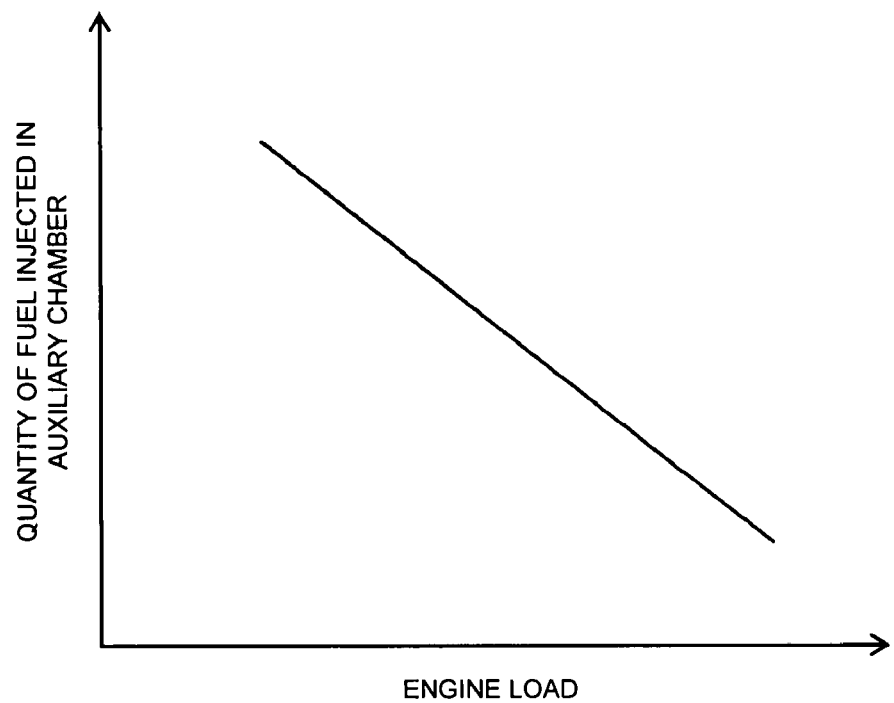
FIG. 4 is a graph illustrating the relation between an engine load and a quantity of fuel injected in an auxiliary combustion chamber.

As shown in FIG. 4, an ejecting torch flame propelled through the injection hole 21 is intensified by increasing the quantity of fuel injected in the auxiliary combustion chamber 20 as the engine load decreases, and is diminished by decreasing the quantity of fuel injected in the auxiliary combustion chamber 20 as the engine load increases.

This makes it possible to expand a lean limit for a sufficient torch required in a low load region and to reduce noise emitted due to combustion by diminishing the ejecting torch flame in a high load region. Accordingly, not only an expansion of the lean limit but also a reduction in burn noise can be attained.

Next, with reference to FIGS. 5 and 6, a description will be given as to the relations between the engine load or engine speed and the fuel injection timing (i.e., fuel injection initiation timing, fuel injection center timing, and fuel injection termination timing) of the first fuel-injecting valve that supplies fuel to the main combustion chamber 5.

Figure 5:
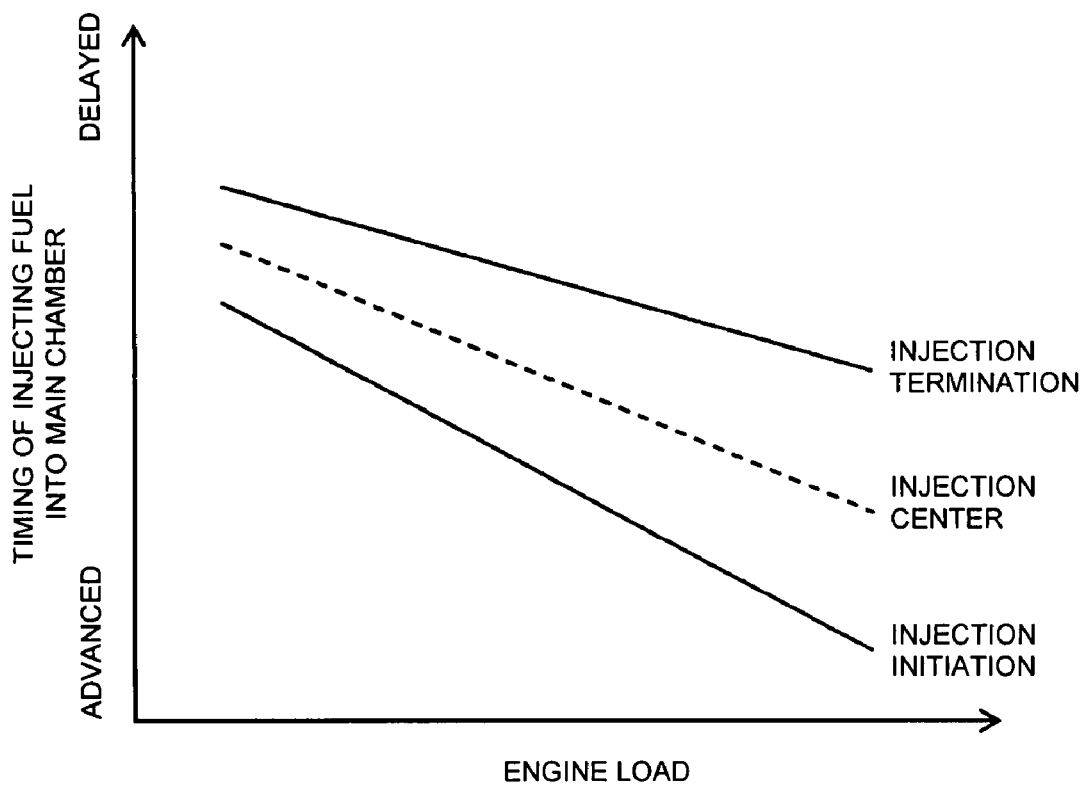
FIG. 5 is a graph illustrating the relation between the engine load and a timing of injecting fuel into a main combustion chamber.

FIG. 5 shows the relation between the engine load and the timing of injecting fuel to the main combustion chamber 5. As the engine load decreases, the fuel injection termination timing is delayed to prevent an air-fuel mixture from being formed, or then excessively diffused when the quantity of injected fuel is small. As the engine load increases, on the other hand, the fuel injection termination timing is advanced to prevent an air-fuel mixture of high concentration from being formed when the quantity of injected fuel is large. The fuel injection initiation timing and fuel injection center timing are altered in accordance with alteration of the fuel injection termination timing in order to ensure that the quantity of fuel injected matches the load.

Figure 6:
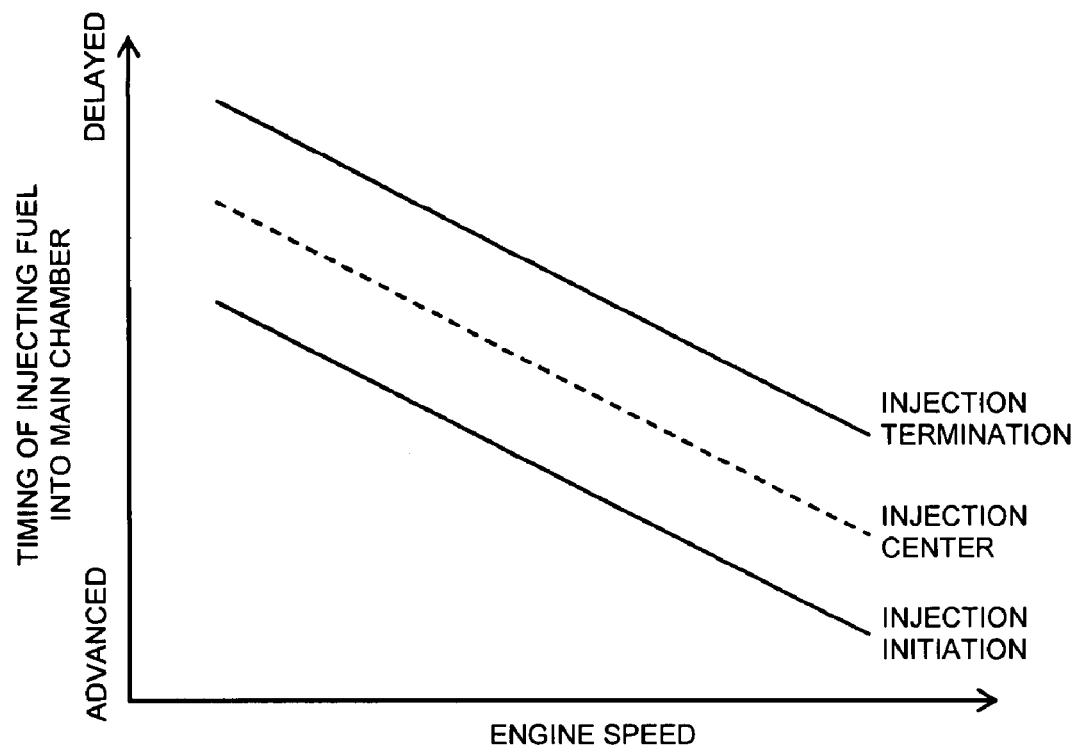
FIG. 6 is a graph illustrating the relation between an engine speed and the timing of injecting fuel into the main combustion chamber.

FIG. 6 shows the relation between the engine speed and the timing of fuel injection into the main combustion chamber 5. As the engine speed increases, the fuel injection timing (i.e., fuel injection initiation timing, fuel injection center timing, and fuel injection termination timing) is advanced. This is because the time taken for an air-fuel mixture to diffuse from the fuel injection timing to the ignition timing, which may tend to shorten as the engine speed increases, must be kept constant.

Figure 7:
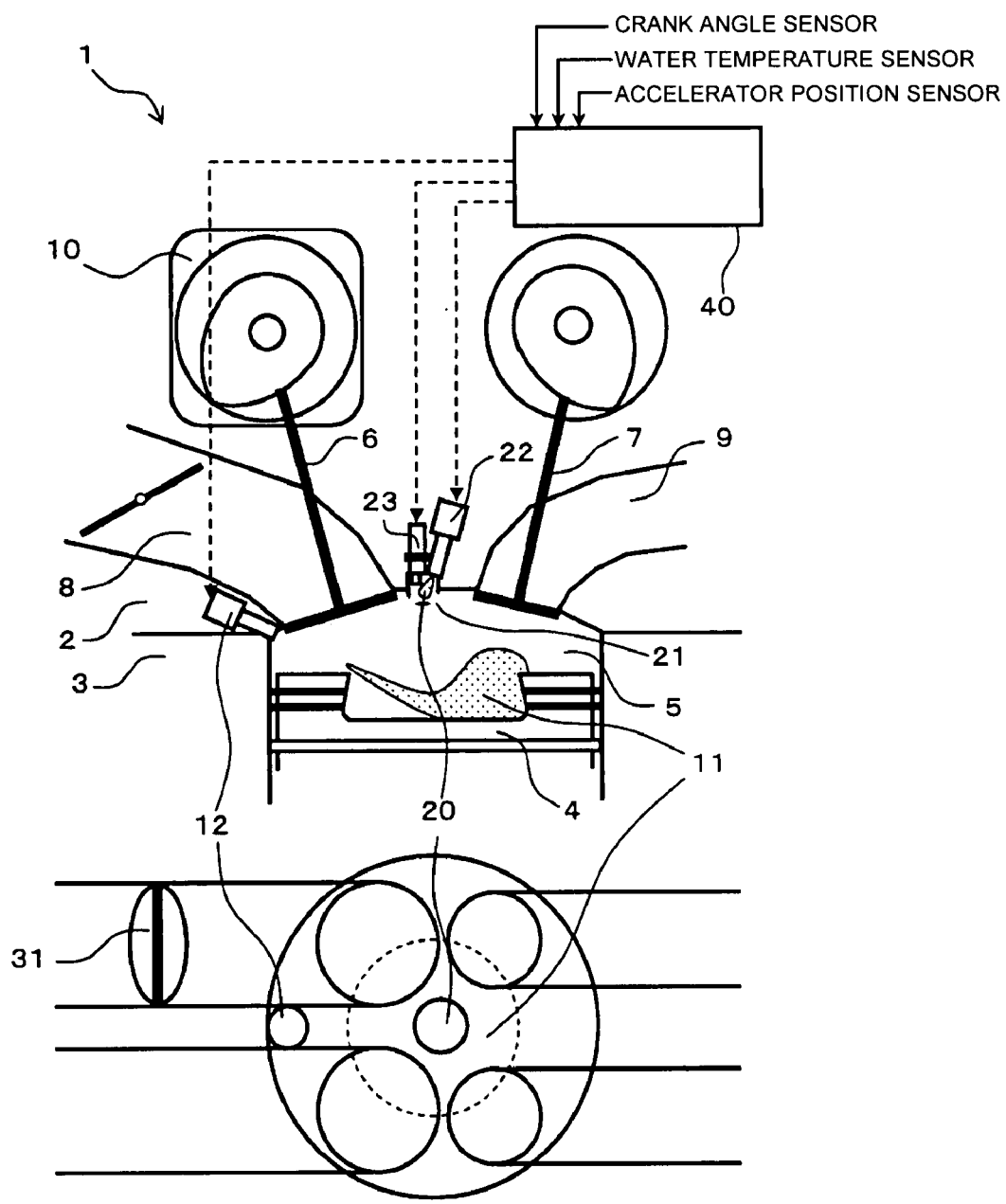
FIG. 7 is a diagram showing the configuration of an internal combustion engine according to a second embodiment of the invention.
Figure 8:
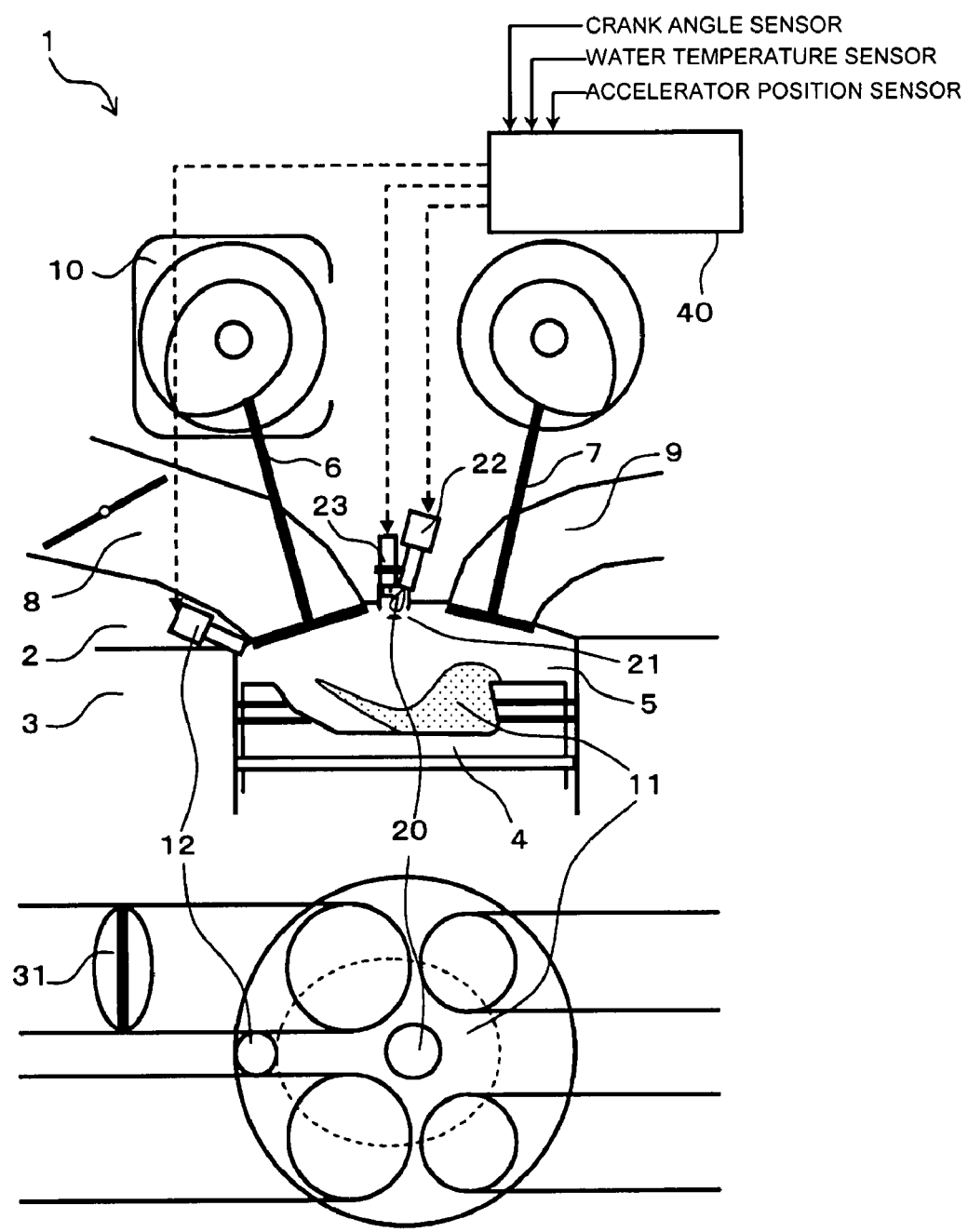
FIG. 8 is a diagram showing the configuration of an internal combustion engine according to a modified example of the second embodiment.

FIGS. 7 and 8 are diagrams showing the configuration of the engine 1 according to a second embodiment of the present invention. FIG. 8 is a modified example of FIG. 7. Only features different from those of the first embodiment will be described below.

In FIGS. 7 and 8, the fuel injection valve 12 for direct injection of fuel into a cylinder is the first fuel-supplying valve that supplies fuel to the main combustion chamber 5. The fuel supply valve is located at one side of the main combustion chamber 5 so as to be oriented toward the cavity 11 made in the piston crown 4, and injects fuel during the compression stroke (hereinafter referred to as "side injection").

In FIG. 7, the upper side of the peripheral wall defining the cavity 11 tapers toward the center of the cylinder. In FIG. 8, however, a portion of the peripheral wall of cavity 11 is formed in the piston crown 4 toward the first fuel-injecting valve (i.e. the cylinder fuel injection valve 12).

Referring to FIGS. 9A to 9E, operation according to the second embodiment will now be described. FIGS. 9A to 9E show a series of operations from the formation of an air-fuel mixture in the main combustion chamber 5 of the engine 1, configured as shown in FIG. 8, to the combustion of the air-fuel mixture by an ejecting torch flame.

Figure 9:
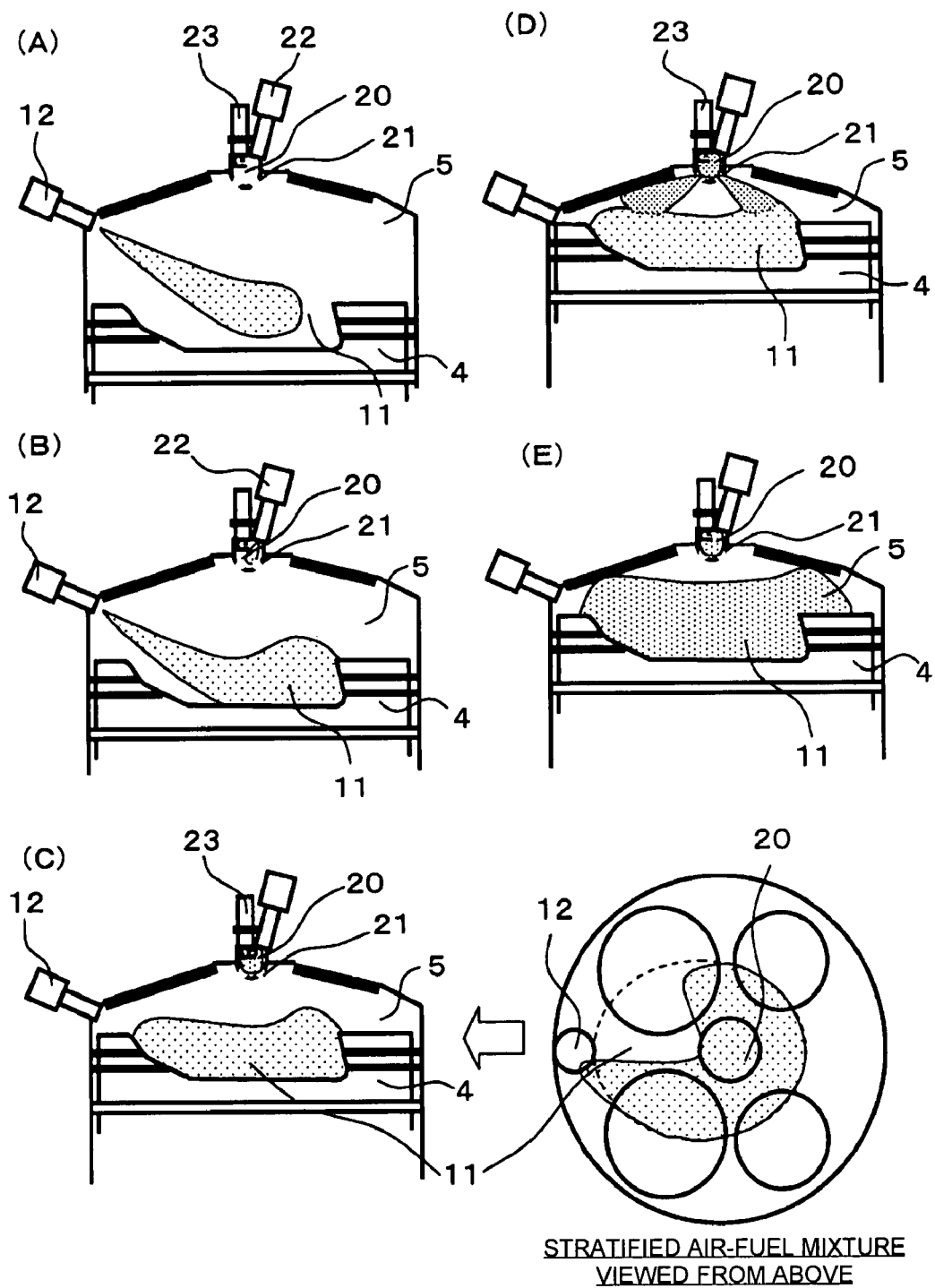
FIGS. 9A to 9E illustrate the formation of an air-fuel mixture and combustion by a torch according to the second embodiment.

During the compression stroke, the fuel injection valve 12 injects fuel from one side toward the cavity 11 made in the piston crown 4. Then, a swirling flow in the main combustion chamber 5 stratifies an air-fuel mixture within the cavity 11 from the circumference of the cavity 11, as shown in FIGS. 9A to 9C. As a result, the air-fuel mixture is formed in the main combustion chamber 5 away from the auxiliary combustion chamber 20. Shortly after the injection of the fuel by the fuel injection valve 12, another fuel is injected in the auxiliary combustion chamber 20 by the auxiliary combustion chamber fuel injection valve 22, as shown in FIG. 9B, and then the ignition plug 23 ignites the fuel in the auxiliary combustion chamber 20, as shown in FIG. 9C. Subsequently, an ejecting torch flame produced as a result of the ignition of the fuel in the auxiliary combustion chamber is propelled into the main combustion chamber 5 from the auxiliary combustion chamber 20 so as to reach the air-fuel mixture stratified in the cavity 11 of the main combustion chamber 5, thus burning the air-fuel mixture, as shown in FIGS. 9D and 9E. At this time, the air-fuel mixture is not present in the vicinity of the injection hole where it is difficult to cause burning by the ejecting torch flame. Therefore, emission of unburned fuel from the vicinity of the injection hole 21 can be reduced and hence heat efficiency is improved.

According to the second embodiment shown in FIGS. 7 and 8 in particular, arranging the fuel injection valve 12 at one side of the main combustion chamber 5 is advantageous in terms of design, in comparison with the configuration where the injection valve 12 is located in the limited space in a central part of the upper part of the main combustion chamber 5.

According to the second embodiment shown in FIG. 8, the cavity 11 is formed in the piston crown 4 toward the first fuel-injecting valve (i.e. the cylinder fuel injection valve 12). The proximity of the cavity 11 to the fuel injection valve 12 prevents diffusion of fuel and allows pooling of the air-fuel mixture near the piston crown 4. Accordingly, the air-fuel mixture supplied to the main combustion chamber 5 can be stratified.

Figure 10:
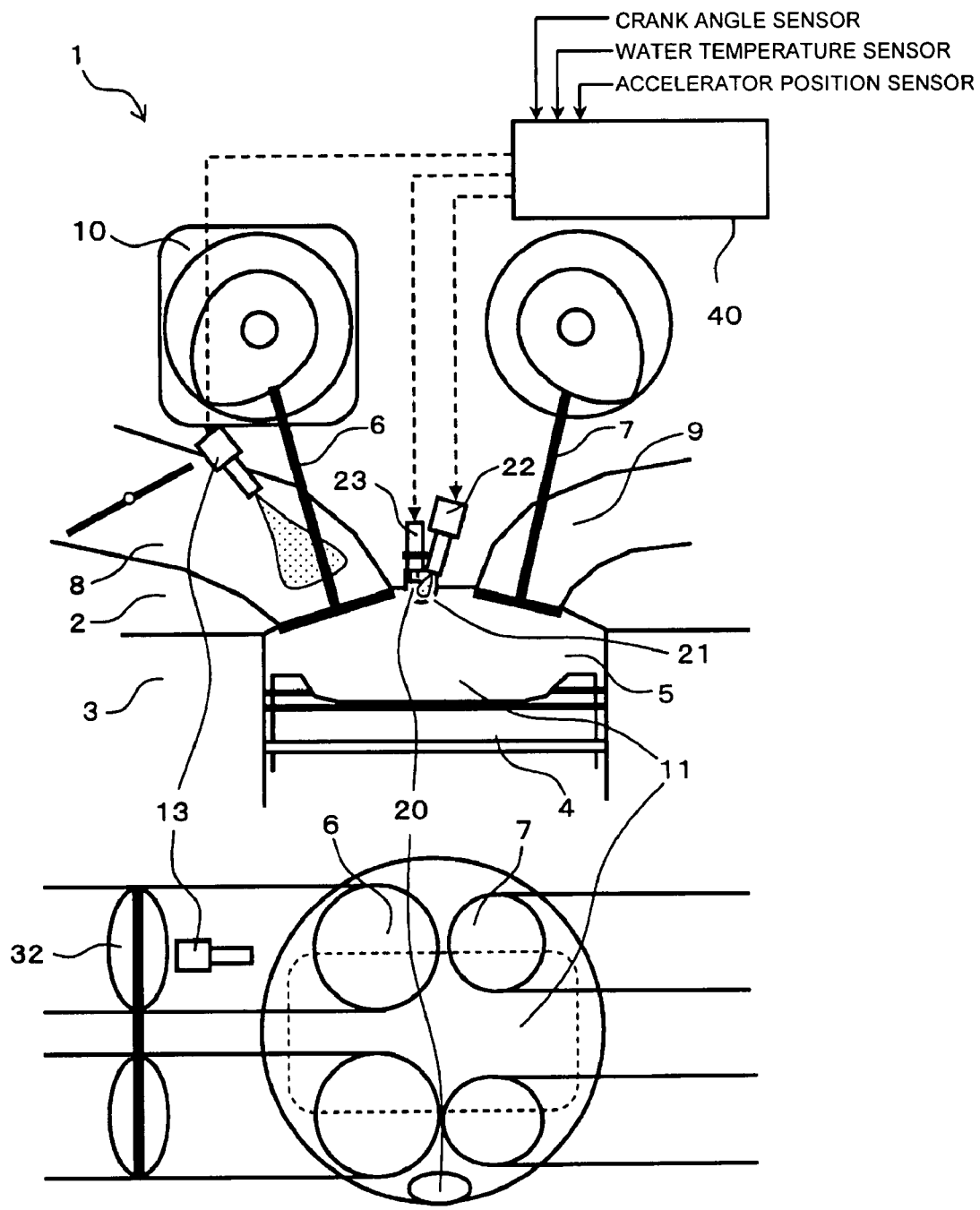
FIG. 10 is a diagram showing the configuration of an internal combustion engine according to a third embodiment of the invention.

Referring next to FIG. 10, there is shown the configuration of an engine 1 according to a third embodiment of the present invention. Only features different from those of the first embodiment shown in FIG. 1 will be described.

A fuel injection valve 13 for port injection is the first fuel-ejecting valve that supplies fuel to the main combustion chamber 5. The fuel injection valve 13 is located in either of the two intake ports 8 in each cylinder so as to be oriented toward the back of the saucer-shaped portion of the intake port 6. During the intake stroke, the fuel injection valve 13 injects fuel into the intake port 8 (hereinafter referred to as "port injection").

The auxiliary combustion chamber 20 is located near the other intake port 8 that is not used for the port injection, and at the side of the main combustion chamber 5, from which side, an ejecting torch flame can be propelled away from a stratified air-fuel mixture, as described below.

In order to create a tumbling flow within the main combustion chamber 5 during the intake stroke, both the intake ports 8 of each cylinder are provided with corresponding tumble control valves 32 capable of opening or closing parts of the cross-sections of the corresponding ports.

The piston crown 4 has the concave cavity 11 in its center. In FIG. 10, the cavity 11 has a generally rectangular shape oriented lengthways along a line connecting the intake valve 6 and corresponding exhausted valve 7.

Next, operation according to the third embodiment will be explained with reference to FIGS. 11A to 11F.

Figure 11:
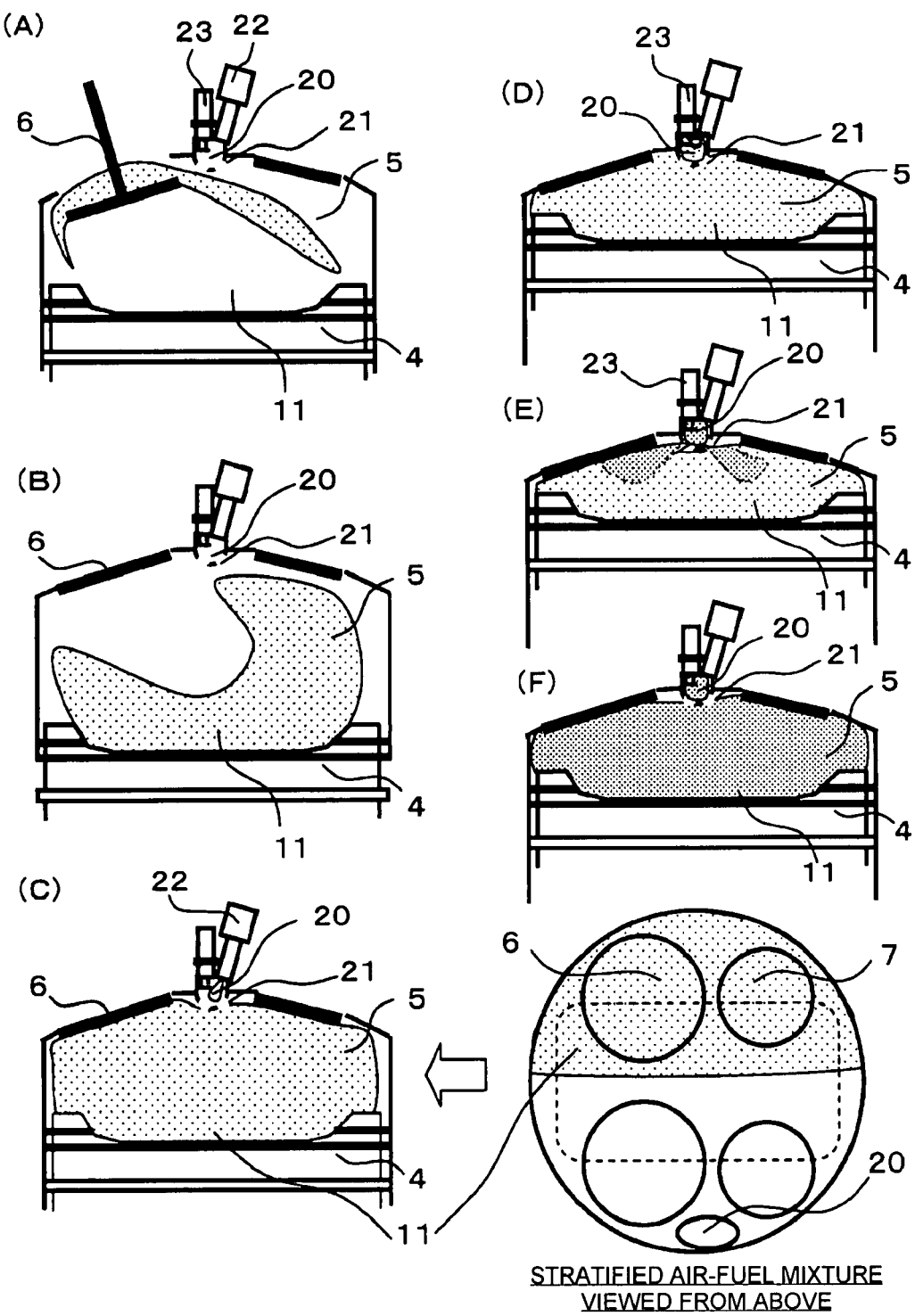
FIGS. 11A to 11F illustrate the formation of an air-fuel mixture and combustion by a torch according to the third embodiment.

In one of the intake ports 8 during the intake stroke, the fuel injection valve 13 for port injection injects fuel toward the back of the saucer-shaped portion of one of the intake valves 6. Then, while a tumbling flow in the main combustion chamber 5 causes the air-fuel mixture to pool in one of the areas into which the inside of the main combustion chamber 5 is bisected by a plane that includes the cylinder center line and the line connecting the intake valve 6 and exhaust valve 7, the air-fuel mixture is stratified in one of the areas of the inside of the main combustion chamber 5 during the compression stroke, as shown in FIGS. 11A to 11C. Accordingly, the air-fuel mixture is formed in the main combustion chamber 5 and away from the auxiliary combustion chamber 20. In addition, during the compression stroke, another fuel is injected into the auxiliary combustion chamber 20 by the auxiliary combustion chamber fuel injection valve 22, as shown in FIG. 11C, and the ignition plug 23 ignites the fuel in the auxiliary combustion chamber 20, as shown in FIG. 11D. Then, an ejecting torch flame resulting from the ignition of the fuel in the auxiliary combustion chamber is propelled into the main combustion chamber 5 from the auxiliary combustion chamber 20 so that the ejecting torch flame reaches the air-fuel mixture stratified in one of the areas of the inside of the main combustion chamber 5, thereby burning the air-fuel mixture, as shown in FIGS. 11E and 11F. At this time, the air-fuel mixture is not present in the vicinity of the injection hole where it is difficult to cause combustion by the ejecting torch flame. Therefore, emission of unburned fuel from the vicinity of the injection hole 21 can be reduced and hence heat efficiency is improved.

According to the third embodiment, the first fuel-injecting valve (i.e., fuel injection valve 13 for port injection) is located in either of the two intake ports 8 in each cylinder, and the fuel injected is caused to flow into the main combustion chamber 5 by the intake stroke. This contributes to the stratification of an air-fuel mixture. In addition, the first fuel injection valve (i.e. fuel injection 13) can be more easily installed than in the case where the first fuel injection valve (i.e., the cylinder injection valve 12) is located in a limited space such as in the middle of the top face of the main combustion chamber 5 or at the side of the main combustion chamber 5. Moreover, the fuel injection valve 13 for port injection can inject fuel at a lower pressure than the fuel injection valve 12.

According to the third embodiment, the tumbling flow effected by tumble control valve 32 boosts the mixing of air and fuel in the main combustion chamber 5 and stratifies the air-fuel mixture in the cavity 11 defined in the main combustion chamber.

In addition, according to the third embodiment, the cavity 11 made in the piston crown 4 is formed lengthways in the direction of the line connecting the intake valve 6 and the exhaust valve 7. This allows the cavity 11 of the piston 4 to pool an air-fuel mixture and retain a tumbling flow within the main combustion chamber 5.

According to the third embodiment, the auxiliary combustion chamber 20 is located at the side of the main combustion chamber 5. With this configuration, the auxiliary combustion chamber 20 can be disposed without taking account of, for example, any alteration in size of the intake valve 6 or exhaust valve 7, which is required where the auxiliary combustion chamber 20 is located on the main combustion chamber 5.

According to the third embodiment, the auxiliary combustion chamber 20 is located at the side of the main combustion chamber 5 such that an ejecting torch flame from the auxiliary combustion chamber 20 intersects the plane of tumbling flow. Consequently, an ejecting torch flame propelled from the injection hole 21 can be more accurately oriented toward an air-fuel mixture when the air-fuel mixture is stratified by a tumbling flow within the main combustion chamber 5.

Figure 12:
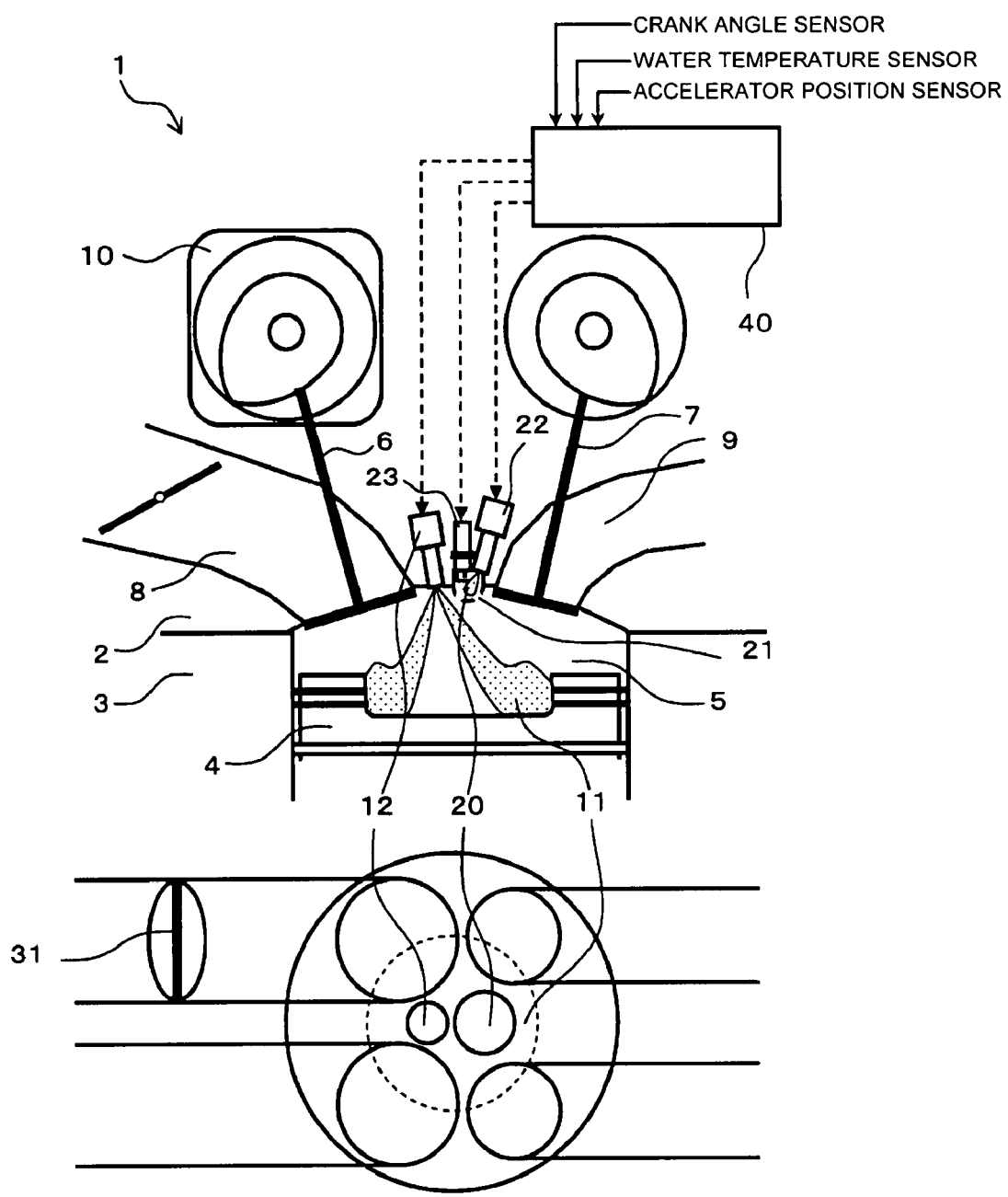
FIG. 12 is a diagram showing the configuration of an internal combustion engine according to a fourth embodiment of the invention.

FIG. 12 is a diagram showing the configuration of the engine 1 according to a fourth embodiment of the present invention. The feature different from that of the first embodiment shown in FIG. 1 is that a peripheral wall defining the cavity 11 extends parallel to the cylinder center line. According to the fourth embodiment, the peripheral wall defining the cavity 11 in the piston crown 4 is parallel to the cylinder center line. Accordingly, an S/V ratio can be made small, in comparison with the cavity 11 defined by the peripheral wall whose upper part tapers toward the cylinder center, as shown in FIG. 1, with the result that cooling loss can be restrained.

Figure 13:
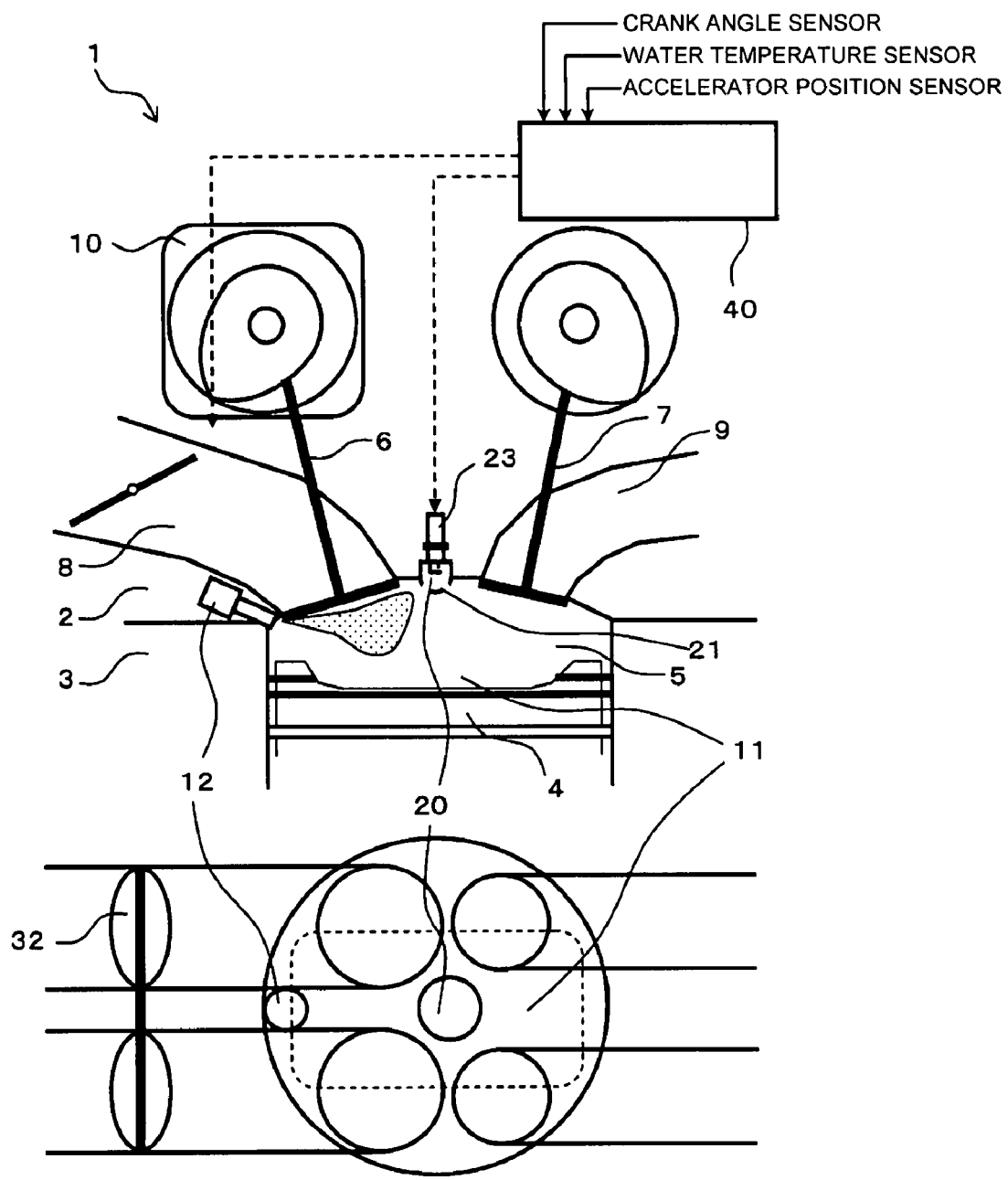
FIG. 13 is a diagram showing the configuration of an internal combustion engine according to a fifth embodiment of the invention.

FIG. 13 is a diagram showing the configuration of the engine 1 according to a fifth embodiment of the present invention. Features different from those of the third embodiment shown in FIG. 10 will be described below.

As the fuel supply device that supplies fuel to the main combustion chamber 5, the cylinder fuel injection valve 12 is located at the side of the main combustion chamber 5 toward the piston crown 4. The fuel injection valve 12 injects fuel into the main combustion chamber 5 during the compression stroke (i.e., side injection).

As the fuel supply device that supplies fuel to the auxiliary combustion chamber 20, the cylinder fuel injection valve 12 has an additional injection hole such that some of the fuel injected by the fuel injection valve 12 is directed toward the auxiliary combustion chamber 20 located on the main combustion chamber 5. Accordingly, the auxiliary combustion chamber 20 is not provided with the fuel injection valve 22.

Referring next to FIGS. 14A to 14E, operation according to the fifth embodiment will be explained.

Figure 14:
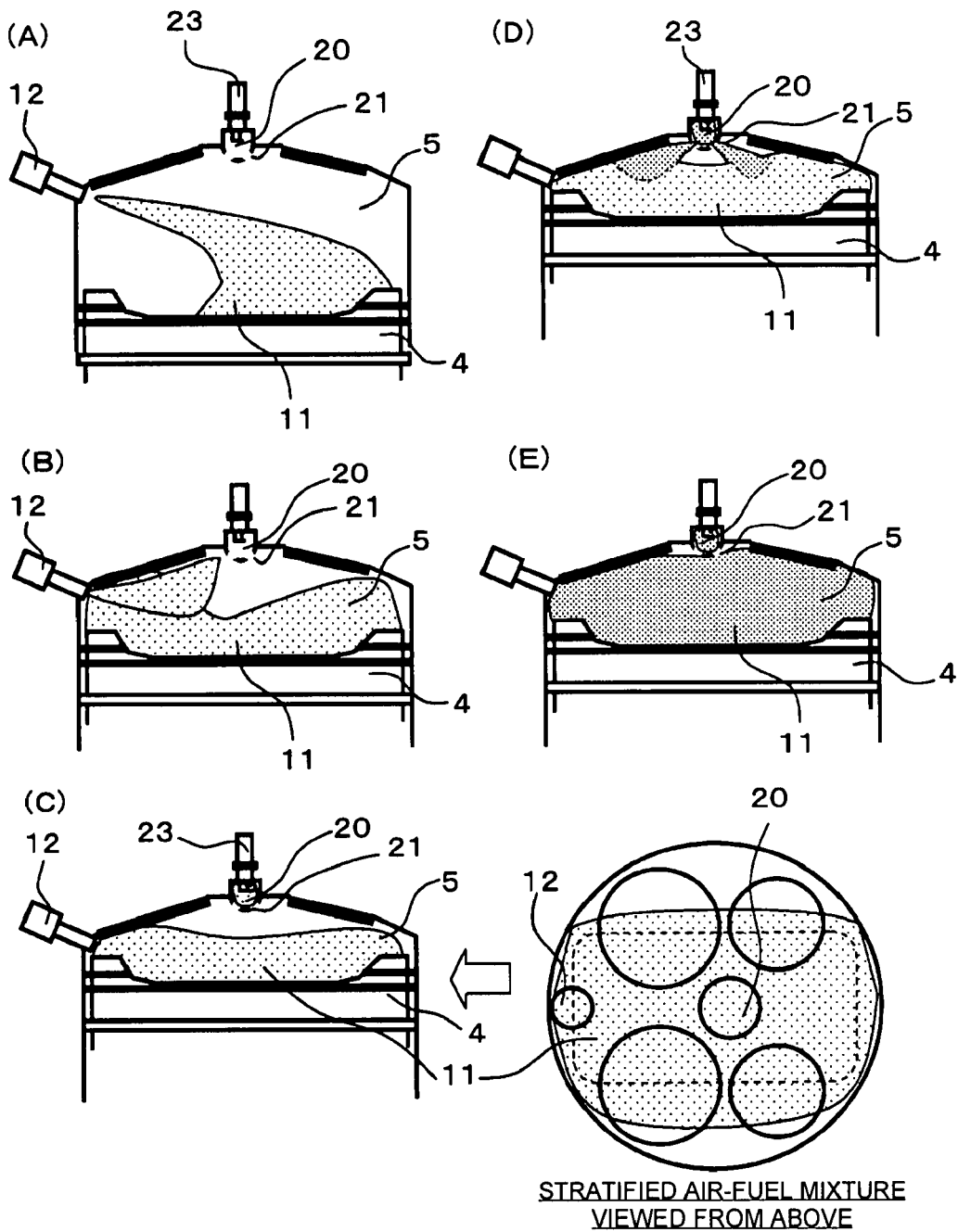
FIGS. 14A to 14E illustrate the formation of an air-fuel mixture and combustion by a torch according to the fifth embodiment.

During the compression stroke, fuel is injected by the fuel injection valve 12 toward the cavity 11 made in the piston crown 4, and an air-fuel mixture is stratified near the top face of the piston 4. Accordingly, the air-fuel mixture is formed in the main combustion chamber 5 and away from the auxiliary combustion chamber 20. Also, some of the fuel is propelled toward the auxiliary combustion chamber 20 through an additional hole formed in the fuel injection valve 12, as shown in FIGS. 14A and 14B. Consequently, this fuel is supplied to the auxiliary combustion chamber 20, and the ignition plug 23 ignites this fuel in the auxiliary combustion chamber 20, as shown in FIG. 14C. Then, an ejecting torch flame resulting from the ignition of the fuel in the auxiliary combustion chamber is propelled into the main combustion chamber 5 from the auxiliary combustion chamber 20 so that the ejecting torch flame reaches the air-fuel mixture stratified near the top face of the piston 4 in the main combustion chamber 5, thereby burning the air-fuel mixture, as shown in FIGS. 14D and 14E. At this time, the air-fuel mixture is not present in the vicinity of the injection hole 21 where it is difficult to cause combustion by the ejecting torch flame. Therefore, emission of unburned fuel from the vicinity of the injection hole can be reduced and hence heat efficiency is improved.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An internal combustion engine, comprising:
 a main combustion chamber partially bounded by a cylinder and a crown of a piston disposed within the cylinder;
 an auxiliary combustion chamber adjacent to the main combustion chamber and smaller in capacity than the main combustion chamber;
 a partition wall between the main combustion chamber and the auxiliary combustion chamber, the partition wall including an injection hole by which the main combustion chamber and the auxiliary combustion chamber communicate;
 means for supplying fuel to the main combustion chamber so that a mixture of air and the supplied fuel is formed in the main combustion chamber,
 means for creating a flow of intake air to stratify the mixture of air and fuel away from the partition wall before ignition such that the mixture is leaner in the vicinity of the injection hole in the partition wall and richer away from the injection hole in the partition wall;
 means for supplying fuel to the auxiliary combustion chamber; and
 means for igniting the fuel in the auxiliary combustion chamber, so that an ejecting torch flame is propelled through the injection hole into the mixture of air and fuel in the main combustion chamber, thereby burning the mixture of air and fuel in the main combustion chamber.

2. The internal combustion engine according to claim 1, wherein the means for supplying fuel to the main combustion chamber includes a first fuel-injecting valve and the means for supplying fuel to the auxiliary combustion chamber includes a second fuel-injecting valve.

3. The internal combustion engine according to claim 2, wherein the first fuel-injecting valve is located at a central portion of a upper face of the main combustion chamber so as to be oriented toward a cavity in the piston crown, and injects the fuel during a compression stroke.

4. The internal combustion engine according to claim 2, wherein the first fuel-injecting valve is located at a side of an upper face of the main combustion chamber so as to be oriented toward a cavity in the piston crown, and injects the fuel during a compression stroke.

5. The internal combustion engine according to claim 2, wherein the first fuel-injecting valve is located in one of two intake ports in the main combustion chamber and causes the fuel to flow into the main combustion chamber during an intake stroke.

6. The internal combustion engine according to claims 2, wherein the second fuel-injecting valve is located so as to directly face the auxiliary combustion chamber.

7. The internal combustion engine according to claim 2, wherein the second fuel-injecting valve supplies fuel which has a burning speed velocity faster than that of the fuel supplied by the first fuel-injecting valve.

8. The internal combustion engine according to claim 7, wherein the fuel supplied by the second fuel-injecting valve is a fuel obtained by modifying the fuel supplied by the first fuel-injecting valve.

9. The internal combustion engine according to claim 1, wherein the means for supplying fuel to the main combustion chamber is a fuel injection valve oriented toward the main combustion chamber, wherein the fuel injection valve injects the fuel toward the piston crown in the main combustion chamber and has an additional injection hole so that some of the fuel is injected toward the auxiliary combustion chamber.

10. The internal combustion engine according to claim 1, further comprising:
 a cavity in the piston crown, the mixture of air and the fuel supplied to the main combustion chamber being stratified in the cavity.

11. The internal combustion engine according to claim 4, wherein the cavity is asymmetrically shaped toward the first fuel-injecting valve.

12. The internal combustion engine according to claim 1, wherein the means for creating a flow of intake air includes a swirl control valve for creating a swirling flow of intake air that enables stratification of the mixture of air and fuel in the main combustion chamber.

13. The internal combustion engine according to claim 3, wherein an upper part of a peripheral wall defining the cavity in the piston crown tapers inwardly toward the center of the cylinder.

14. The internal combustion engine according to claim 3, wherein a peripheral wall defining the cavity in the piston crown is parallel to the center line of the cylinder.

15. The internal combustion engine according to claim 5,
wherein the means for creating a flow of intake air includes a tumble control valve in each of the intake ports for creating a tumbling flow of the mixture of intake air and fuel bounded by a plane bisecting the cylinder so that the mixture is stratified on one side of the main combustion chamber; and
wherein the auxiliary combustion chamber is located on another side of the main combustion chamber so that the ejecting torch flame from the auxiliary combustion chamber intersects the plane of the tumbling flow.

16. The internal combustion engine according to claim 5, wherein the piston crown includes a cavity having a generally rectangular shape oriented lengthways along a line connecting an intake valve and an exhaust valve.

17. The internal combustion engine according to claim 1, wherein the auxiliary combustion chamber is located at a central portion on an upper face the main combustion chamber.

18. The internal combustion engine according to claim 1, wherein as an engine load increases, the means for supplying fuel to the auxiliary combustion chamber decreases a quantity of fuel injected in the auxiliary combustion chamber.

19. The internal combustion engine according to claim 1, wherein as the engine load increases, the means for supplying fuel to the main combustion chamber advances a timing of injecting the fuel into the main combustion chamber.

20. The internal combustion engine according to claim 9, wherein the piston crown includes a cavity having a generally rectangular shape oriented lengthways along a line extending from the injection hole of the auxiliary combustion chamber.

21. The internal combustion engine according to claim 3, wherein the first fuel-injecting valve injects the fuel so that the mixture of air and fuel stratifies in the form of a doughnut in a cavity in the piston crown.

22. The internal combustion engine according to claim 17, wherein the torch flame is propelled evenly around a central axis of the cylinder.

23. A combustion method for an internal combustion engine, the engine including a main combustion chamber; an auxiliary combustion chamber adjacent to the main combustion chamber and smaller in capacity than the main combustion chamber; a partition wall between the main combustion chamber and the auxiliary combustion chamber, the partition wall including an injection hole by which the main combustion chamber and the auxiliary combustion chamber communicate; a fuel supply device for supplying fuel to the main combustion chamber and the auxiliary combustion chamber; and an ignition device, the method comprising:
forming a mixture of air and the supplied fuel in the main combustion chamber, the mixture being stratified away from the partition wall before ignition such that the mixture is leaner in the vicinity of the injection hole in the partition wall and richer away from the injection hole in the partition wall;
igniting the fuel in the auxiliary combustion chamber by the ignition device; and
propelling an ejecting torch flame in the auxiliary combustion chamber into the mixture of air and fuel in the main combustion chamber through the injection hole, thereby burning the mixture of air and fuel in the main combustion chamber.

24. The combustion method for an internal combustion engine according to claim 23, comprising:
supplying fuel to the main combustion chamber via a first fuel-injecting valve; and
supplying fuel to the auxiliary chamber via a second fuel-injecting valve.

25. An internal combustion engine, comprising:
a main combustion chamber partially bounded by a cylinder and a crown of a piston disposed within the cylinder;
an auxiliary combustion chamber adjacent to the main combustion chamber and smaller in capacity than the main combustion chamber;
a partition wall between the main combustion chamber and the auxiliary combustion chamber, the partition wall including an injection hole by which the main combustion chamber and the auxiliary combustion chamber communicate;
a fuel supply device for supplying fuel to the main combustion chamber and the auxiliary combustion chamber;
a mixture forming device for forming a mixture of air and the supplied fuel in the main combustion chamber, such that the mixture is stratified away from the partition wall before ignition such that the mixture is leaner in the vicinity of the injection hole in the partition wall and richer away from the injection hole in the partition wall; and
an ignition device for igniting the fuel in the auxiliary combustion chamber, so that an ejecting torch flame is propelled through the injection hole into the mixture of air and fuel in the main combustion chamber, thereby burning the mixture of air and fuel in the main combustion chamber.

* * * * *